(12) United States Patent
Mori et al.

(10) Patent No.: US 6,312,232 B1
(45) Date of Patent: Nov. 6, 2001

(54) METHOD AND APPARATUS FOR SUPPRESSING RESONANCE

(75) Inventors: Hideo Mori; Toshiyuki Mizuno; Toshihiro Kawai; Atsuko Yoshizumi, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/307,897

(22) Filed: May 10, 1999

(30) Foreign Application Priority Data

May 11, 1998 (JP) .................................. 10-127802

(51) Int. Cl.$^7$ ...................................... F04B 39/00
(52) U.S. Cl. .......................... 417/297; 417/312; 138/31; 138/43; 181/403
(58) Field of Search ..................... 417/297, 269, 417/270, 279, 222.2, 312; 138/31, 43; 181/226, 227, 403

(56) References Cited

U.S. PATENT DOCUMENTS

| 4,177,023 | * | 12/1979 | Kamiya et al. | ...................... 417/540 |
| 4,403,921 | * | 9/1983 | Kato et al. | ............................ 417/296 |
| 4,836,757 | | 6/1989 | Curwen et al. . | |
| 5,145,326 | * | 9/1992 | Kimura et al. | ..................... 417/222.2 |
| 5,499,515 | | 3/1996 | Kawamura et al. . | |
| 5,605,447 | | 2/1997 | Kim et al. . | |

FOREIGN PATENT DOCUMENTS

| 44 21 771 | 1/1995 | (DE) . |
| 0 589 667 | 3/1994 | (EP) . |
| 1-116292 | 5/1989 | (JP) . |
| 1-138381 | 5/1989 | (JP) . |
| 2-004981 | 1/1990 | (JP) . |
| 5-006166 | 1/1993 | (JP) . |
| 7-189909 | 7/1995 | (JP) . |
| 7-310664 | 11/1995 | (JP) . |

* cited by examiner

*Primary Examiner*—Charles G. Freay
(74) *Attorney, Agent, or Firm*—Morgan & Finnegan, LLP

(57) ABSTRACT

A compressor includes a discharge chamber into which pressurized refrigerant gas is intermittently discharged. The pressurized refrigerant gas in the discharge chamber is sent to an external refrigerant circuit. A chamber for accommodating a resonance suppressing adapter is located between a discharge muffler and the external refrigerant circuit. The adapter includes a float valve and a spring. The float valve can move between a position connecting the accommodation chamber to the muffler and a position disconnecting the accommodation chamber from the muffler. The spring urges the float valve to its closed position. The force of the spring is determined such that the discharge pulse frequency of the refrigerant gas does not coincide with the natural resonance frequency of the external refrigerant circuit or at least such that the amplitude of pressure variations of the refrigerant gas is reduced.

18 Claims, 8 Drawing Sheets

METHOD AND APPARATUS FOR SUPPRESSING RESONANCE

BACKGROUND OF THE INVENTION

The present invention relates to a method for preventing or suppressing resonance of piping caused by pulsation of pressurized fluid sent into the piping from a discharge pressure zone, which is intermittently supplied with the pressurized fluid.

Typically, an automotive air conditioning system includes a compressor. The compressor intermittently discharges compressed refrigerant gas (pressurized fluid) into a fluid passage, or piping, which is connected to the compressor. Therefore, pulsation occurs due to the flow of high refrigerant gas (or gas pressure fluctuation) in the piping. It is known that such pulses result in resonance, which produces noise. Accordingly, various proposals have been made to prevent resonance resulting from the pulsation.

Resonance may be prevented by modifying the structure of the fluid piping extending from the compressor so that the resonance frequency of the piping differs from the pulse frequency. For example, the hardness of the piping connected to the compressor may be changed. Alternatively, the length, weight, or degree of bending of the coupler that connects the piping to the compressor may be changed. In such cases, however, the resonance resulting from pulsation must be taken into consideration each time the piping is changed. This increases the production cost of the piping and decreases productivity.

Resonance may also be prevented when employing a multiple cylinder axial piston type compressor by forming some or all pistons, which are located in respective cylinder ores, with different lengths. In this case, the pistons having different lengths also have different top clearances, which is the clearance defined when the piston is moved to its top dead center position in the associated cylinder bore. This also changes the resonance frequency of the fluid passage from the pulse frequency and prevents resonance caused by pulsation.

However, the resonance frequency of the piping differs from one vehicle type to another. In other words, the piping of each vehicle type has a unique resonance frequency. Thus, the compressor must be modified in accordance with the vehicle type so that its pulse frequency differs from the resonance frequency of the piping. In other words, even if the same type of compressor is installed in different vehicle types, the top clearance of the pistons must be changed in accordance with the vehicle type. This increases in production costs and decreases productivity.

SUMMARY OF THE INVENTION

Accordingly, it is an objective of the present invention to provide an inexpensive and effective method and apparatus for preventing or suppressing resonance in piping caused by pulsation of pressurized fluid.

To achieve the above objective, the present invention provides a method for reducing pipe resonance of a pipe carrying pressurized fluid when the pressurized fluid flows from an intermittently pressurized zone along a fluid passage that includes the pipe. The method includes the following steps: Providing a movable valve body in the fluid passage, wherein the valve body can be moved by the flow of the pressurized fluid; Restricting the movement of the valve body with a predetermined restricting force; and determining the restricting force such that the frequency of pressure variation of the pressurized fluid flowing in the pipe is changed to differ significantly from the natural frequency of the pipe or such that the amplitude of pressure variation of the pressurized fluid flowing in the pipe is reduced.

The present invention further provides an apparatus for reducing pipe resonance of a pipe carrying pressurized fluid when the pressurized fluid is conveyed to flow from an intermittently pressurized zone along a fluid passage that includes the pipe. The apparatus includes a movable valve body located in the fluid passage. The valve body can be moved by the flow of the pressurized fluid. A restricting means applies a predetermined force to the valve body. The predetermined force is determined such that the frequency of pressure variation of the pressurized fluid flowing in the pipe is changed to differ significantly from the natural frequency of the pipe or such that the amplitude of pressure variation of the pressurized fluid flowing in the pipe is reduced.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of a resonance suppressor, which is used in an automotive air conditioning system, will now be described.

Figure 1:
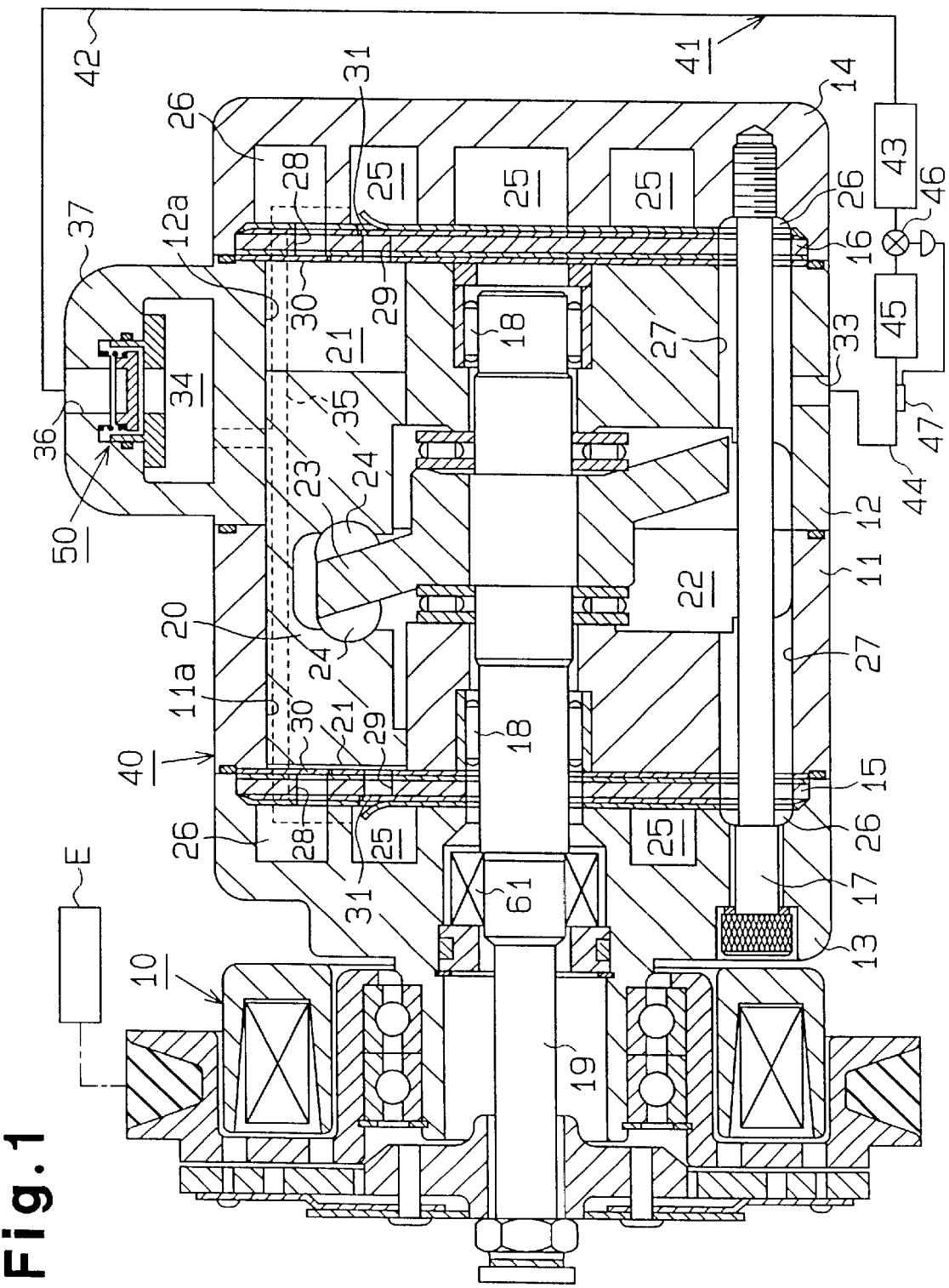
FIG. 1 is a cross-sectional view showing a swash plate type compressor according to a first embodiment of the present invention.

A typical air conditioning system includes a heater circuit for producing a warm air current and a refrigerant circuit for producing a cool air current. As shown in FIG. 1, the refrigerant circuit includes a compressor 40, which compresses a refrigerant, and an external refrigerant circuit 41, which includes a piping that connects the discharge and suction sides of the compressor. The external refrigerant circuit 41 includes a discharge pipe 42, which is connected to the discharge side of the compressor 40, and a suction pipe 44, which is connected to the suction side of the compressor 40. A condenser 43 is arranged in the discharge pipe 42, while an evaporator 45 is arranged in the suction pipe 44. An expansion valve 46 is located between the discharge and suction pipes 42, 44.

The expansion valve 46, which is located between the condenser 43 and the evaporator 45, functions as a variable throttling resistor and expands liquid refrigerant from a high temperature high pressure state into a low temperature low pressure state (e.g., atomized state). The position, or opening size, of the expansion valve 46 is feedback controlled in accordance with the refrigerant temperature, which is detected by a temperature sensor 47 located near the outlet of the evaporator 45. This adjusts the refrigerant flow rate so that the refrigerant evaporated by the evaporator 45 is adequately superheated. Metal tubing or rubber hose may be used to form the discharge pipe 42 and the suction pipe 44. Furthermore, couplers (not shown) are provided to connect the compressor 40, the condenser 43, the evaporator 45, the expansion valve 46, and other components to the discharge and suction pipes 42, 44.

The compressor 40, which, in the illustrated embodiment, is a swash plate type compressor employing double-headed pistons, will now be described.

As shown in FIG. 1, the compressor 40 has a front cylinder block 11, a rear cylinder block 12, a front housing 13, and a rear housing 14. The front and rear cylinder blocks 11, 12 are fixed to each other. The front housing 13 is coupled to the front end of the front cylinder block 11 with a valve plate 15 arranged in between, while the rear housing 14 is coupled to the rear end of the rear cylinder block 12 with a valve plate 16 arranged in between. Bolts 17 (only one shown) integrally fasten the cylinder blocks 11, 12, the front and rear housings 13, 14, and the valve plates 15, 16 to form a compressor housing.

A drive shaft 19 is rotatably supported in the cylinder blocks 11, 12 by radial bearings 18. A seal 61 seals the space formed between the front portion of the drive shaft 19 and the front housing 13. The drive shaft 19 is operably connected to an engine E, which serves as an external drive source, by an electromagnetic clutch mechanism 10, which is arranged on the front end of the drive shaft 19. The clutch mechanism 10 connects the engine E to the drive shaft 19 to rotate the drive shaft 19.

A plurality of front cylinder bores 11a (five in this embodiment) extend about the drive shaft 19 in the front cylinder block 11, while a plurality of rear cylinder bores 12a (five in this embodiment), which are aligned with the front cylinder bores 11a, extend about the drive shaft 19 in the rear cylinder block 12. In other words, the compressor 40 is a ten cylinder compressor. Each pair of associated front and rear cylinder bores 11a, 12a is coaxial and extends parallel to the drive shaft 19. Each pair of cylinder bores 11a, 12a accommodates a cylindrical double-headed piston. In each cylinder bore 11a, 12a, a compression chamber 21 is defined between each head of each piston 20 and the corresponding valve plate 15, 16.

A crank chamber 22 is defined between the two cylinder blocks 11, 12. A swash plate 23 is fixed to the drive shaft 19 in the crank chamber 22 to rotate integrally with the drive shaft 19. A recess is formed in the middle portion of each piston 20. A pair of shoes 24 connects the recess of each piston 20 to the peripheral portion of the swash plate 23. Accordingly, the shoes 24 convert the rotation of the swash plate 23 to reciprocation of the pistons 20.

An annular discharge chamber 25 and an annular suction chamber 26, which surrounds the discharge chamber 25, are defined in each housing 13, 14. The front and rear suction chambers 26 are each connected to the crank chamber 22 through a suction passage 27 (which extends through a bore used by one of the bolts 17). The suction passage 27 is connected to the suction pipe 44 of the external refrigerant circuit 41 through an inlet 33, which extends through the lower portion of the rear cylinder block 12. The crank chamber 22, the suction chamber 26, the suction passage 27, and the inlet 33 form a suction pressure region, which is influenced by the pressure (suction pressure) of the refrigerant gas drawn in from the external refrigerant circuit 41.

A suction port 28 and a discharge port 29 extend through each valve plate 15, 16 in correspondence with each cylinder bore 11a, 12a. Each suction port 28 is provided with a suction flap 30 and each discharge port 29 is provided with a discharge flap 31 on the valve plates 15, 16. Each suction flap 30 permits refrigerant gas to be drawn into the associated compression chamber 21 from the corresponding suction chamber 26 when the piston 20 moves from its top dead center position to its bottom dead center position (i.e., during the suction stroke). Each discharge flap 31 permits refrigerant gas to be discharged from the compression chamber 21 and into the suction chamber 26 when the piston 20 moves from the bottom dead center position to the top dead center position (i.e., during the discharge stroke) and compresses the refrigerant gas to a predetermined discharge pressure. In this embodiment, pressurized fluid refers to the high pressure refrigerant gas discharged into the discharge chamber 25.

Figure 2:
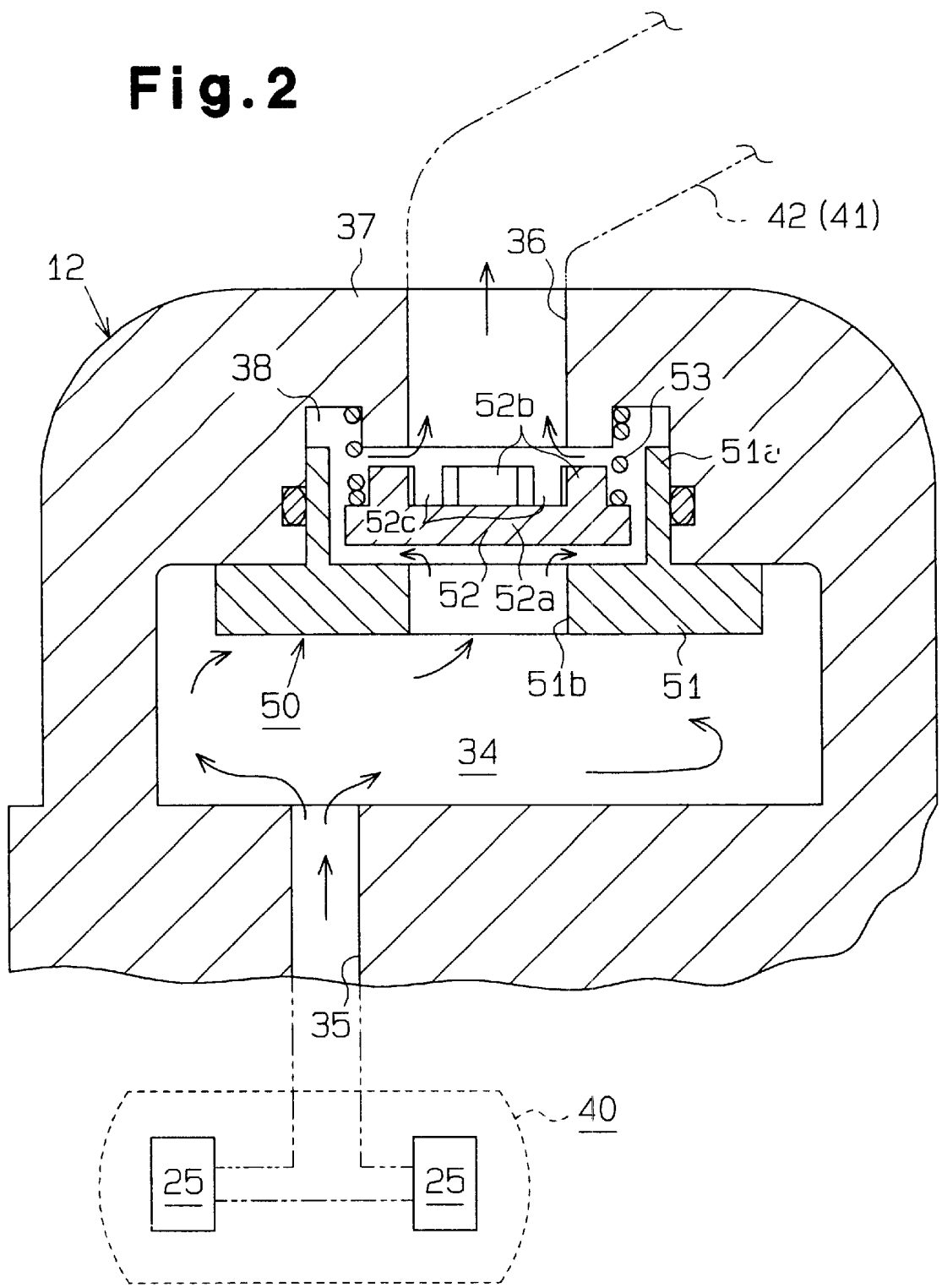
FIG. 2 is an enlarged cross-sectional view showing a resonance suppressing adapter of the compressor of FIG. 1.

As shown in FIGS. 1 and 2, a muffler housing 37 is formed on the upper portion of the rear cylinder block 12. The muffler housing 37 houses a muffler 34. The muffler 34 is connected to the front and rear discharge chambers 25 through a discharge passage 35, which extends through the housing members 11–16. Accordingly, the high pressure refrigerant gas discharged into the discharge chambers 25 from the cylinder bores 11a, 12a is sent to the discharge pipe 42 by way of the muffler 34. The discharge chamber 25, the muffler 34, and the discharge passage 35 form a discharge pressure region, or a pressurized zone, which is influenced by the pressure (discharge pressure) of the refrigerant gas sent out into the external refrigerant circuit 41.

As shown in FIGS. 1 and 2, an adapter 50 for suppressing resonance is arranged near an outlet 36 of the muffler 34. The adapter 50 functions as a resonance suppressing apparatus, a pulse frequency converting apparatus, and a pulse absorbing apparatus. The adapter 50 includes a valve seat 51, a float valve 52, which serves as a valve body, and an urging member 53, which serves as a movement restricting means.

The muffler housing 37 has an upper wall, which includes a cylindrical cavity connected with the outlet 36. The valve seat 51 is arranged in the muffler 34 at the lower portion of the cavity. The valve seat 51 has a tubular portion 51a, which contacts the cylindrical wall of the cavity. The tubular portion 51a is fitted into the cavity to fix the valve seat 51 to the muffler housing 37 and define an accommodation chamber 38 in the cavity. A communication bore 51b, the diameter of which is about the same as that of the outlet 36, extends through the center of the valve seat 51. Accordingly, the accommodation chamber 38 is connected to the muffler 34 and the discharge passage 35 through the communication bore 51b and to the discharge pipe 42 through the outlet 36.

Figure 7:
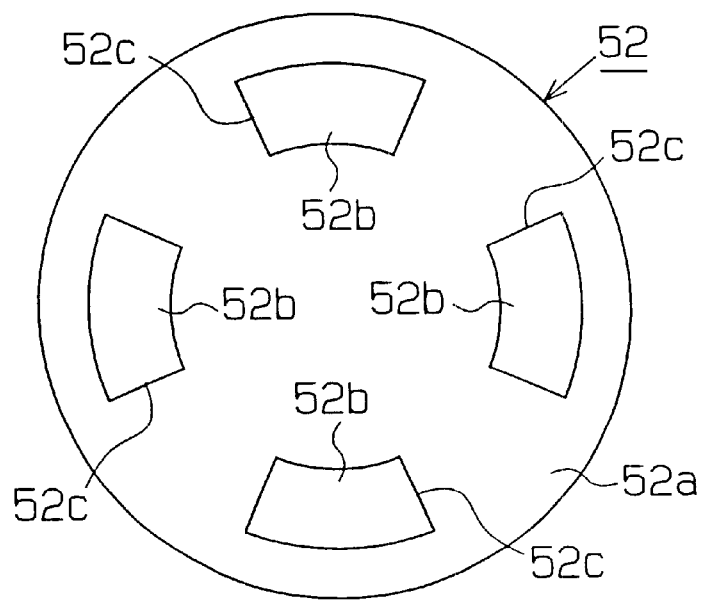
FIG. 7 is a plan view showing a float valve employed in the adapter of FIG. 2.

A float valve 52 and a valve-urging member 53 are accommodated in the accommodation chamber 38. As illustrated in FIGS. 2 and 7, the float valve 52 is substantially diskshaped and includes a valve body 52a. The diameter of the valve body 52a is smaller than the inner diameter of the tubular portion 51a. of the valve seat 51 and is greater than the diameter of the communication bore 51b. Arcuate projections 52b, the number of which is four in this embodiment, are formed on the top surface of the valve body 52a. The projections 52b form an annular ring. A space 52c exists between each pair of adjacent projections 52b. The projections 52b selectively contact the wall surrounding the entrance of the outlet 36. The float valve 52 moves axially in the accommodation chamber 38.

Figure 3:
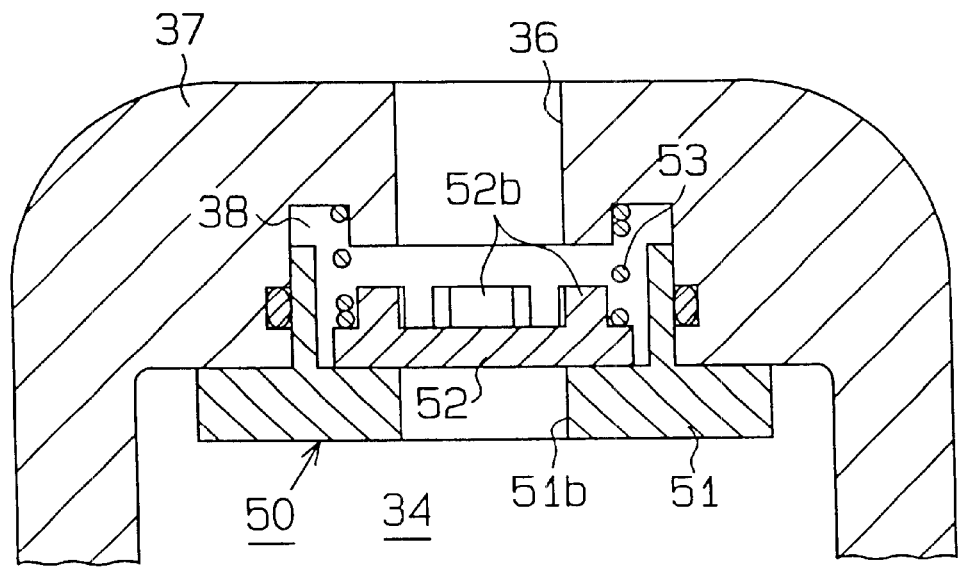
FIG. 3 is an enlarged cross-sectional view showing the adapter of FIG. 2 located at a lowermost position.
Figure 4:
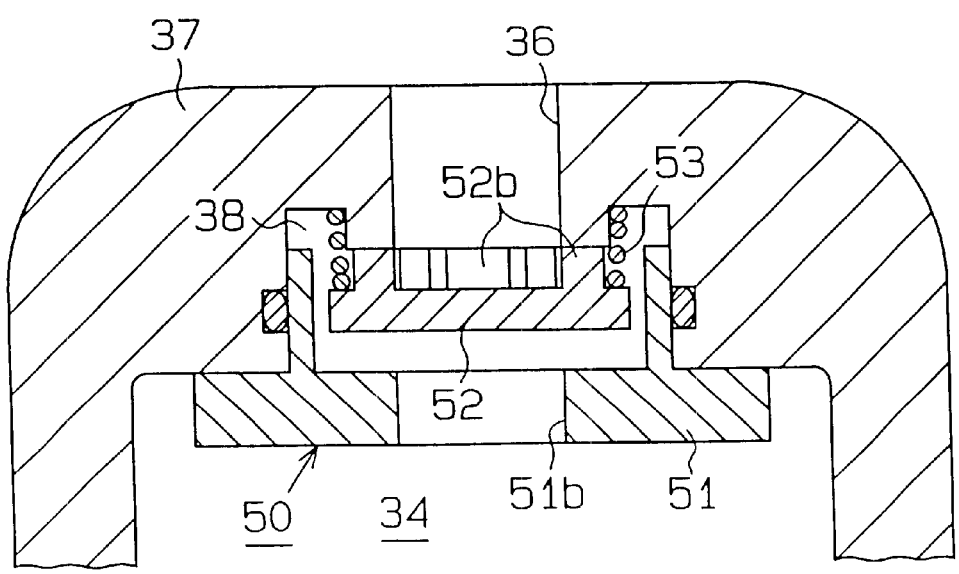
FIG. 4 is an enlarged cross-sectional view showing the adapter of FIG. 2 located at an uppermost position.

When the float valve 52 is at the lowest position in the accommodation chamber 38, as illustrated in FIG. 3, that is, when the float valve 52 contacts the valve seat 51, the float valve 52 closes the communication bore 51b of the valve seat 51 and disconnects the interior of the compressor from the discharge pipe 42. When the float valve 52 is at the highest position as illustrated in FIG. 4, that is, when the float valve 52 contacts the rim of the outlet 36, the float valve 52 opens the communication bore 51b and connects the outlet 36 with the accommodation chamber 38 through the space 52c. Accordingly, the interior of the compressor is connected with the discharge pipe 42. The adapter 50, which includes the float valve 52, is fully open when the projections 52b contact the rim of the outlet 36.

Although the float valve 52 moves between the lowest position and the highest position, the float valve 52 can be held at, intermediate positions between the lowest and highest positions. That is, the float valve floats in the accommodation chamber 38. Also, under certain condition, the float valve 52 is constantly held at, or floats in, an intermediate position. When the float valve 52 remains at an intermediate position, as shown in FIG. 2, the position of the float valve 52 is referred to as a float position.

As illustrated in FIGS. 2 to 4, a valve-urging member 53 is located between the top wall of the accommodation chamber 38 and the float valve 52. The valve-urging member 53 is made of a flexible material and urges the float valve 52 downward, that is, in a direction opposite to the flowing direction of the pressurized fluid. The valve-urging member 53 is preferably a spring and more preferably a coil spring. The spring constant of the spring 53 is adjusted to allow the adapter 50 to optimally convert the pulse frequency and to suppress the amplitude of the pulsation.

The pulse frequency refers to the number of changes, or pulses, of the discharge pressure Pd in the discharge pressure zone during one turn of the drive shaft 19 and the swash plate 23. Since the swash plate type compressor with doubleheaded pistons illustrated in FIG. 1 has ten cylinders, the pulse frequency of the compressor would be ten if the adapter 50 were not located between the discharge passage 35 and the discharge pipe 42. The piping, or external refrigerant circuit 41, has a natural resonance frequency. If the natural resonance frequency of the piping matches the pulse frequency of the compressor (discharge pulse frequency), the piping resonates while the compressor is operating, which produces noise and excessive vibration.

In the illustrated embodiment, the spring constant of the spring 53, which constitutes the adapter 50, is adjusted to differentiate the pulse frequency of the compressor from the natural resonance frequency of the piping. The adapter 50 also reduces the pressure amplitude of the discharge pulse. The typical usage of the illustrated embodiment will now be described.

First example: when the natural resonance frequency of the piping is substantially equal to the pulse frequency of the compressor.

The pulse frequency of a ten-cylinder compressor is ten. If the natural resonance frequency of the piping substantially matches the pulse frequency of ten, a measure for suppressing resonance of the piping is to change the pulse frequency to a number that is greatly different from ten by using the adapter 50. Specifically, the measure includes choosing a relatively great spring constant k for the spring and setting a minimum spring force to, for example, 0.3 kgf. The minimum spring force refers to the force applied to the float valve 52 by the spring 53 when the float valve 52 is at the lowest position (see FIG. 3).

The graphs of FIGS. 5A to 5D illustrate the results of an experiment where the spring load was set as described above. The horizontal axis represents time and shows one cycle, during which the drive shaft 19 rotates one turn. In the experiment, the ratio between the discharge pressure Pd and the suction pressure Ps (Pd/Ps) is 15/2 and the rotation speed of the drive shaft 19 is 700 rpm.

Figure 5A:
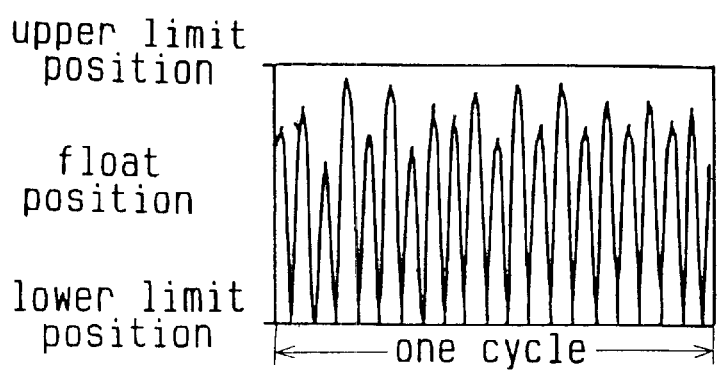
FIG. 5A is a graph showing changes in the axial position of the float valve, which resulted from experiments on a first example of the resonance suppressing adapter of FIG. 2.

The graph of FIG. 5A shows changes of the axial position of the float valve 52 in the accommodation chamber 38. During one compressor cycle, the float valve 52 moves up and down, or reciprocates, twenty times. The range of the axial movement is relatively wide. That is, the float valve 52 reaches the vicinity of the lowest and the highest positions.

Figure 5B:
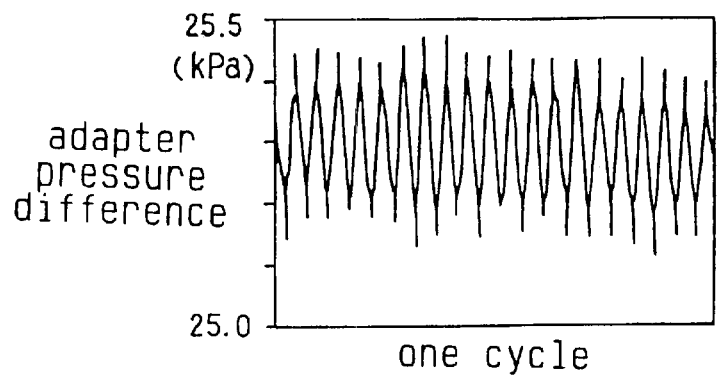
FIG. 5B is a graph showing changes in the difference between the pressure of the downstream side of the adapter and the pressure of the upstream side of the adapter, which resulted from experiments on the first example of the resonance suppressing adapter of FIG. 2.

The graph of FIG. 5B shows the difference between the pressure upstream of the adapter 50 (in the muffler 34) and the pressure downstream of the adapter 50 (in the discharge pipe 42). This pressure difference will hereafter be referred to as the adapter pressure difference. During one compressor cycle, the pressure difference cycles approximately twenty times and the amplitude is 0.3 to 0.4 kPa (kilo Pascal).

Figure 5C:
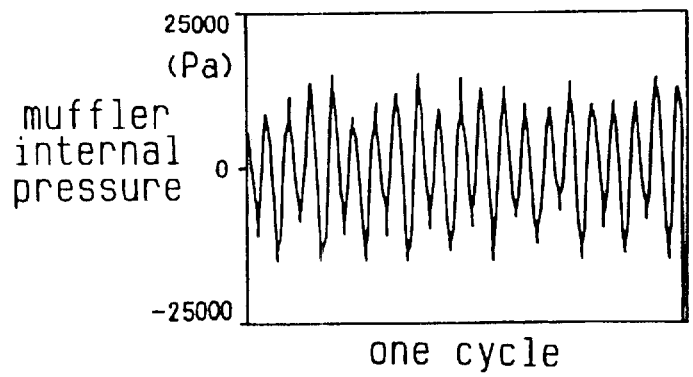
FIG. 5C is a graph showing changes in the pressure of a muffler, which resulted from experiments on the first example of the resonance suppressing adapter of FIG. 2.

The graph of FIG. 5C shows pressure variation in the muffler 34. During one compressor cycle, the pressure in the muffler 34 cycles approximately twenty times. The pressure in the muffler 34 fluctuates between +15,000 Pa (Pascal) and −15,000 Pa.

Figure 5D:
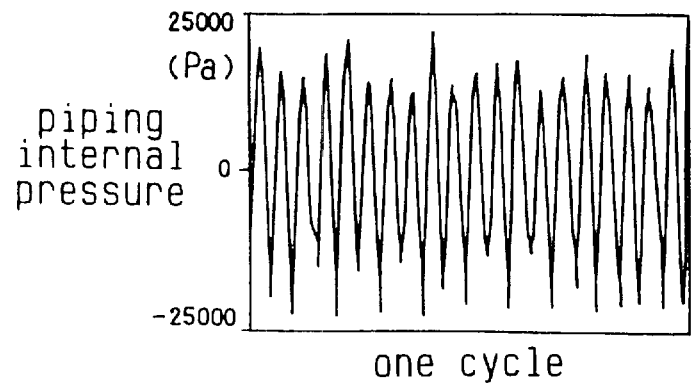
FIG. 5D is a graph showing changes in the pressure of a discharge pipe, which resulted from experiments on the first example of the resonance suppressing adapter of FIG. 2.

The graph of FIG. 5D shows pressure variation in the discharge pipe 42. During one compressor cycle, the pressure in the discharge pipe 42 cycles approximately twenty times. The pressure in the discharge pipe 42 fluctuates between +23,000 Pa and −23,000 Pa.

As is obvious in the graphs of FIGS. 5A to 5D, the pulse frequency of the compressor displacement, which is originally ten, is changed to twenty. Specifically, the pulse frequency is doubled by placing the adapter 50 in the path of the pressurized fluid and increasing the spring constant k of the spring 53, which increases the minimum spring load to a relatively high value (0.3 kgf).

The reason that the adapter 50 doubles the natural pulse frequency of the compressor is as follows. Since the spring constant k of the spring 53 is chosen to be relatively high, the float valve 52 is forced to shift between the lowest position and the highest position twice per discharge from a cylinder bore (see FIG. 5A). Because of the structural characteristics of the adapter 50, the cross-sectional area of the fluid path in the adapter 50 changes from the minimum to the maximum when the float valve 52 shifts from the lowest position to the highest position and changes from the maximum to the minimum when the float valve 52 shifts from the highest position to the lowest position. This fluctuates the pressure difference between the upstream and downstream sides of the float valve 52. Specifically, when the cross-sectional area of the fluid path is minimum, the pressure difference is great, and when the cross-sectional area of the fluid path is maximum, the pressure difference is small. Fluctuations, or cycles, of the pressure variation occur twice per discharge, since each discharge shifts the float valve 52 to the fully open position, and then the valve returns. Accordingly, the pulse frequency of the compressor is doubled.

How the pulse frequency is doubled will now be described in more detail in reference to the movement of the float valve 52. In the state of FIG. 3, the float valve 52 closes the communication bore 51b of the valve seat 51 by way of the force of the spring 53. At this time, the cross-sectional area of fluid path in the adapter 50 is zero. If the contact between the float valve 52 and the valve seat 51 were incomplete, the cross-sectional area of fluid path would be minimum. When a cylinder bore discharges fluid once, the pressure in the muffler 34 is further raised and the pressure difference between the upstream and downstream sides of the float valve 52 is increased. This moves the float valve 52 toward the highest position against the force of the spring 53. When the float valve 52 leaves the lowest position, pressurized refrigerant gas enters into the accommodation chamber 38 from the muffler 34, which decreases the adapter pressure difference. When the float valve 52 reaches the highest position, the float valve 52 fully opens the outlet 36, which minimizes the adapter pressure difference.

While the float valve 52 moves toward the highest position, the spring 53 contracts. The force of the spring 53 is gradually increased in accordance with the contraction amount of the spring 53 (the axial movement of the float valve 52). The force of the spring 53 acts to move the float valve 52 downward. Therefore, when the movement of the float valve 52 toward the highest position reaches a limit, the force of the spring 53 moves the float valve 52 in the opposite direction, toward the lowest position. At this time, the adapter pressure difference changes in the following manner. When the float valve 52 leaves the highest position (fully open position) and reaches the vicinity of the lowest position (fully closed position), the float valve 52 completely or nearly completely closes the communication bore 51b of the valve seat 51, which increases the adapter pressure difference. When the float valve 52 reaches the lowest position, or the vicinity of the lowest position, the float valve 52 is in the state of FIG. 3. When the float valves moves toward the lowest position, the spring 53 extends, which gradually decreases the force of the spring 53. Thus, the pressure difference between the upstream and downstream sides of the float valve 52 is increased, which moves the float valve 52 toward the highest position again as described above.

In this manner, the float valve 52 shifts twice during one discharge from a cylinder bore. Thus, the pressure in the discharge pipe 42 has two peaks, which reflects a doubling of the pulse frequency of the compressor.

Second example: When the natural resonance frequency does not coincide with the pulse frequency of the compressor.

When the natural resonance frequency of the piping does not coincide with the pulse frequency (ten) of the ten cylinder compressor, there are three choices in designing the compressor in terms of pulse frequency.

Choice 1: Do not attach the adapter 50.

Choice 2: Use the adapter 50 to double the pulse frequency.

Choice 3: Use the adapter 50 but dramatically reduce the spring force of the spring 53.

Since the natural resonance frequency does not coincide with the pulse frequency of the compressor, choice 1 seems to be a good one. Choice 2 is also a rational choice if the doubled pulse frequency still does not coincide with or becomes farther away from the natural resonance frequency of the piping. However, in the designs of choices 1 and 2, the amplitude of the discharge pulse of the compressor 40, that is, the amplitude of the cyclical variation of the discharge pressure Pd, cannot be significantly reduced. In other words, these designs of choices 1 and 2 cannot reduce the absolute size of pulse.

However, it has been proven through experiments that the choice 3 can reduce the amplitude of the discharge pulse of the compressor 40. A real example according to choice 3 will now be described.

In this, the second, example, a spring having small spring constant k' is used as the valve-urging member 53. In particular, the spring constant k' is set to about a third of the spring constant k in the first example (k'=k/3), for example, the minimum spring load of the spring 53 is set to 0.1 kgf.

The graphs of FIGS. 6A to 6D respectively show the results of the experiment according to the second example. The horizontal axis of each graph is a time axis, which represents the period while the drive shaft 19 makes one rotation, that is, one compressor cycle. In this experiment, the ratio of the discharge pressure Pd to the suction pressure Ps (Pd/Ps) is 15/2, and the rotation speed of the drive shaft 19 is 700 rpm.

Figure 6A:
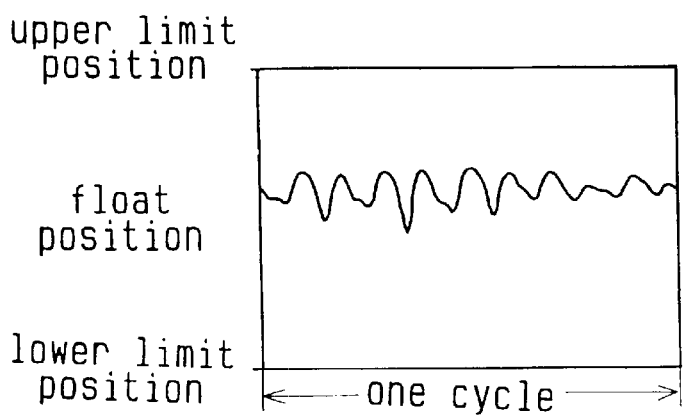
FIG. 6A is a graph showing changes in the axial position of the float valve, which resulted from experiments on a second example of the resonance suppressing adapter of FIG. 2.

The graph of FIG. 6A shows the variation of the axial position of the float valve 52 in the accommodation chamber 38. The float valve 52 reaches neither the bottom limit position nor the top limit position and remains substantially in intermediate positions (float positions) between the top and the bottom positions. The float valve 52 moves up and down, or reciprocates, about 10 times while floating. Accordingly, in the second example, the float valve 52 constantly floats while vibrating up and down within small range.

Figure 6B:
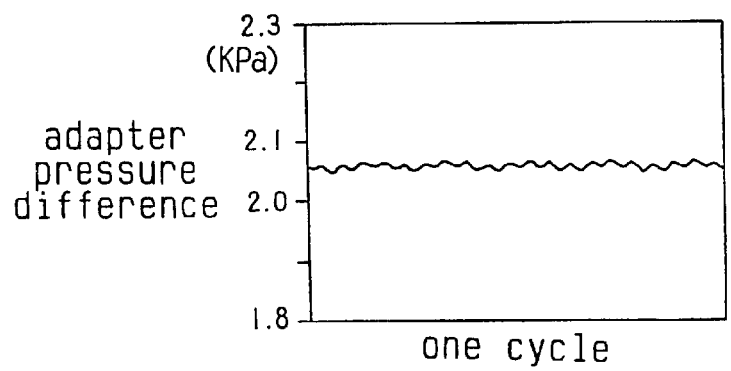
FIG. 6B is a graph showing changes in the difference between the pressure of the downstream side of the adapter and the pressure of the upstream side of the adapter, which resulted from experiments on the second example of the resonance suppressing adapter of FIG. 2.

The graph of FIG. 6B shows the pressure difference between the upstream and the downstream sides of the adapter 50. There is little change of the pressure difference in one cycle. The pressure difference stays at the level of about 2.05 kPa.

Figure 6C:
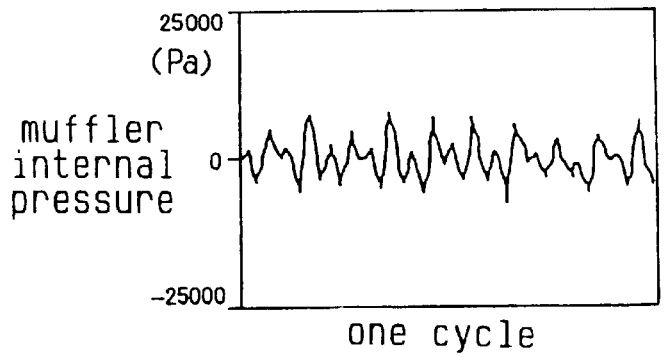
FIG. 6C is a graph showing changes in the pressure of a muffler, which resulted from experiments on the second example of the resonance suppressing adapter of FIG. 2.

The graph of FIG. 6C shows the internal pressure variation in the muffler 34. Though there are 10 to 20 muffler pressure cycles in one compressor cycle, the peaks are not clear enough to precisely count their total number. The internal pressure of the muffler 34 changes within the range from about +8000 Pa to −8000 Pa.

Figure 6D:
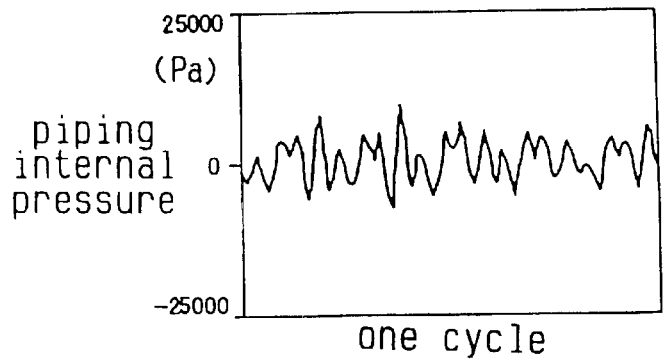
FIG. 6D is a graph showing changes in the pressure of a discharge pipe, which resulted from experiments on the second example of the resonance suppressing adapter of FIG. 2.

The graph of FIG. 6D shows the variation of the internal pressure of the discharge pipe 42. While there are 10 to 20 pressure cycles in one compressor cycle, the peaks are not clear enough to count their total number. The internal pressure of the discharge pipe 42 changes within the range from about +10000 Pa to −10000 Pa.

As understood from the above description, the discharge pulse frequency of the compressor is dispersed in the range of ten to twenty by providing the adapter 50 in the pressurized fluid passage and by reducing the spring constant of the spring 53 to k' and setting the minimum spring load to a relatively small value (0.1 kgf). Furthermore, the amplitude of the discharge pulse is greatly reduced. This is clearly shown by comparing FIGS. 5C, 5D to FIGS. 6C, 6D.

As described with reference to FIG. 6A, according to the spring force setting of the second example, the float valve 52 substantially floats (see FIG. 2) while moving up and down within a small range, as long as the compressor is normally operating. This suppresses intermittent and pulsating discharge (or discharge shock to piping) from each cylinder bore while minimizing the resistance to refrigerant gas flow in the adapter 50. If a simple fixed restriction passage is provided in place of the adapter 50, in which the float valve 52 is held elastically, the restriction passage will not have the cushioning action performed by the float valve 52.

The present embodiment has the following advantages.

By increasing the spring constant k of the valve-urging member 53 of the resonance suppressing adapter 50 and by increasing the force of the valve-urging member 53 (the restricting force of the float valve 52), the discharge pulse frequency from the compressor (ten) is multiplied to a different frequency (twenty). Accordingly, it is possible to deliberately change the pulse frequency of the pressurized fluid to avoid coincidence with the natural resonance frequency of the piping and thus prevent resonance in the piping.

The pulse frequency of the compressor can be converted from the original pulse frequency (ten) to a different pulse frequency by reducing the spring constant of the valve-urging member 53 of the adapter 50 and its spring force (or restricting force). Furthermore, the amplitude of the pulses from the compressor is greatly reduced. Accordingly, this reduces resonance and noise.

Resonance of piping is prevented or limited by providing the adapter 50 in the discharge piping of vehicle air conditioning system. There is no need to take complicated measures on the piping and the compressor, thus reducing manufacturing costs.

The force of the valve-urging member 53 may be set relatively high by increasing the loading of the valve-urging member 53. In this case, the adapter 50 permits pressurized refrigerant to be discharged from the muffler 34 to the external refrigerant circuit 41 and also serves as a check valve for preventing reverse flow of liquid refrigerant from the external refrigerant circuit 41 to the muffler 34.

The present invention may be embodied as follows.

The adapter 50 may be located in a joint and a service flange for connecting the compressor 40 and the external refrigerant circuit 41 or in the discharge pipe 42.

The elastic valve urging member does not have to be the spring 53 (especially not coil spring). It may be replaced with rubber member as long as it has the same function as a spring.

Figure 8:
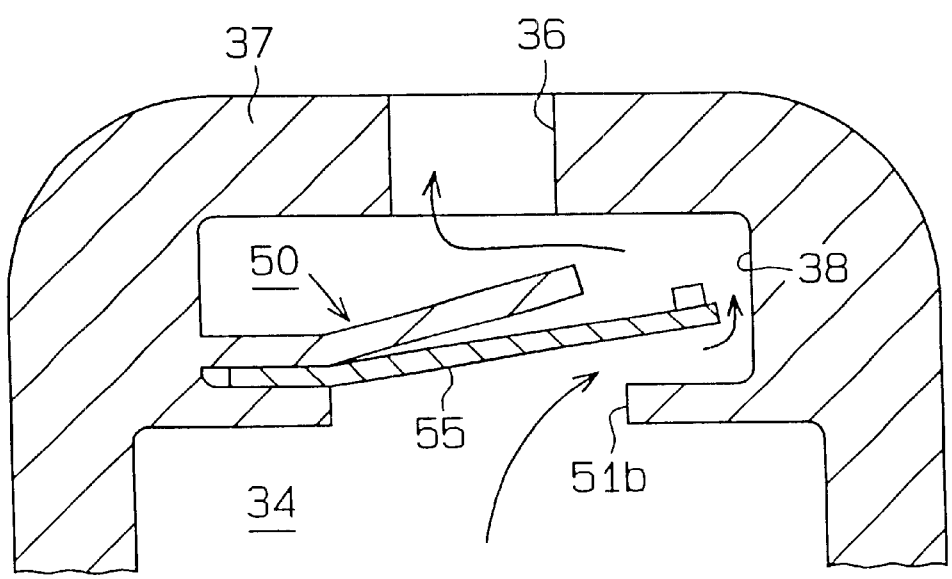
FIG. 8 is a cross-sectional view showing a resonance suppressing adapter employed in a second embodiment according to the present invention.

As shown in FIG. 8, an adapter 50 having a plate spring 55 may be provided in an accommodation chamber 38, which includes a communication bore 51b (corresponding to the communication bore 51b of the valve seat 51 of FIG. 2) and an outlet 36. The proximal end of the plate spring 55 is fixed to the wall of the accommodation chamber 38, which permits the plate spring 55 to move elastically. The plate spring 55 normally closes the communication bore 51b and opens the communication bore 51b when the internal pressure of the muffler 34 increases to a certain level. That is, the plate spring 55 has the same function as the float valve 52 of FIG. 2. The plate spring 55 is both a valve body and an elastic valve urging member. This structure has the same advantages as the adapter 50 of FIG. 2.

Figure 9:
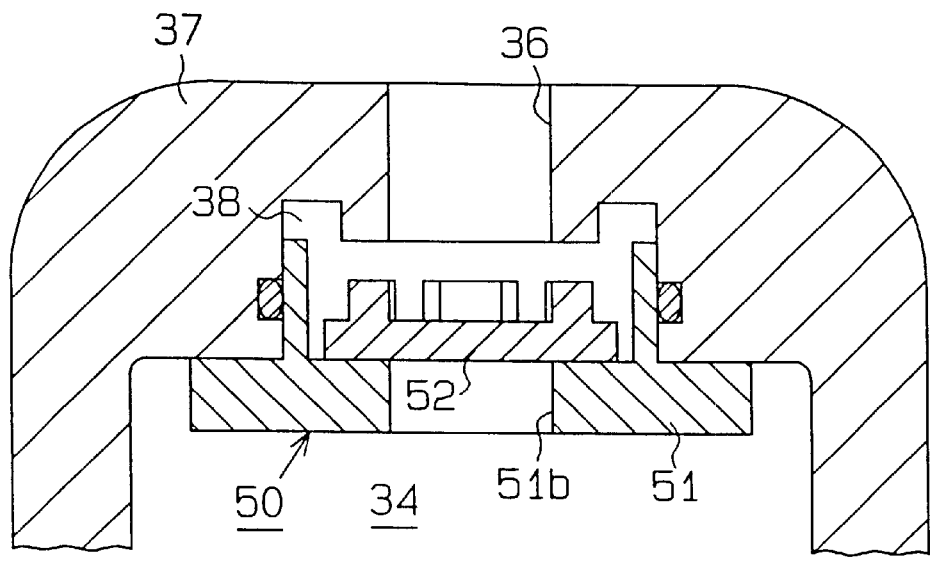
FIG. 9 is a cross-sectional view showing a resonance suppressing adapter employed in a third embodiment according to the present invention.

The valve-urging member 53 may be omitted from the adapter 50 of FIG. 2, and the adapter 50 may be as shown in FIG. 9. In this case, the float valve 52 is urged in a direction opposite to the flow of the refrigerant gas by its own weight. Therefore, the axis of the adapter 50 must be perpendicular to the ground. The force urging the float valve 52 downward is determined by the weight of the float valve 52. This construction has the same advantages as the adapter 50 of FIG. 2.

Figure 10:
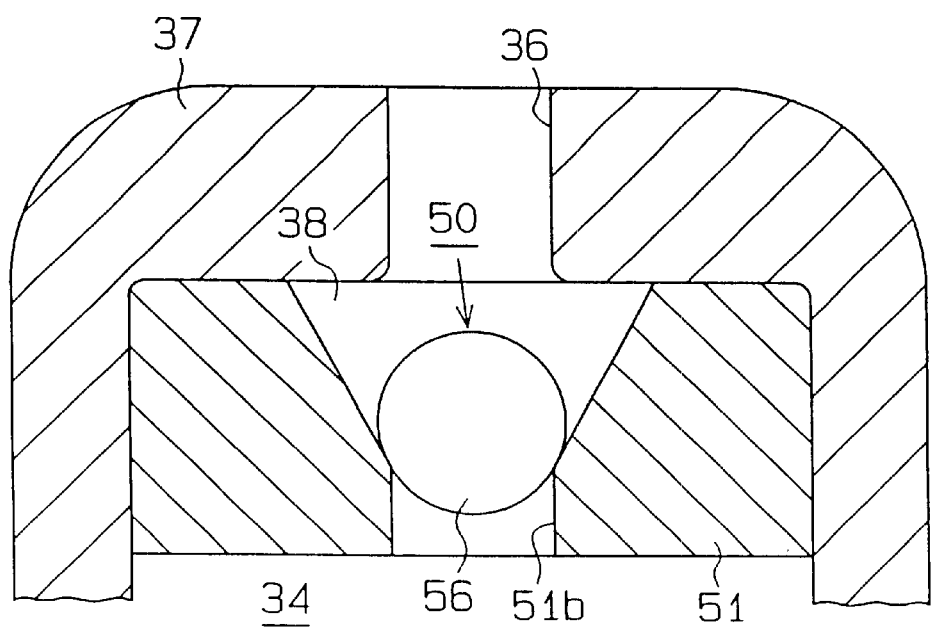
FIG. 10 is a cross-sectional view showing a resonance suppressing adapter employed in a fourth embodiment according to the present invention.

An adapter 50 as shown in FIG. 10 may also be used. The principle of FIG. 10 is the same as that of FIG. 9. However, a sphere 56 is used as a valve body, the accommodation chamber 38 is bowl-shaped, and the valve seat 51 is sized to fit the sphere. This construction has the same advantages as the adapter 50 of FIG. 2.

Figure 11A:
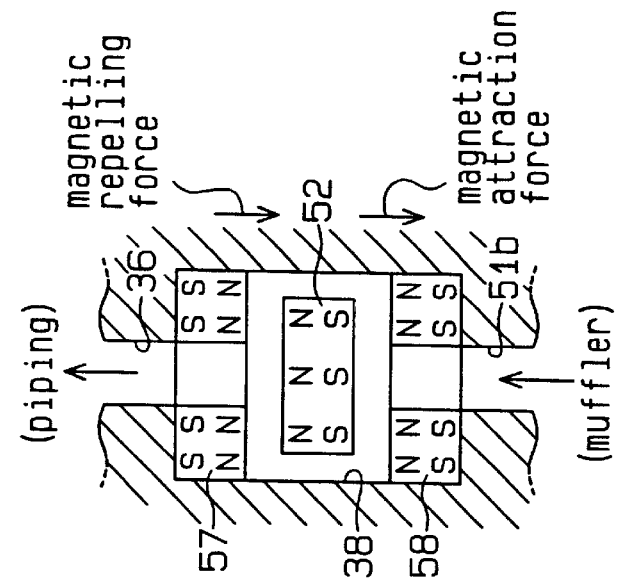
FIG. 11A is a cross-sectional view showing a resonance suppressing adapter employed in a fifth embodiment according to the present invention.
Figure 11B:
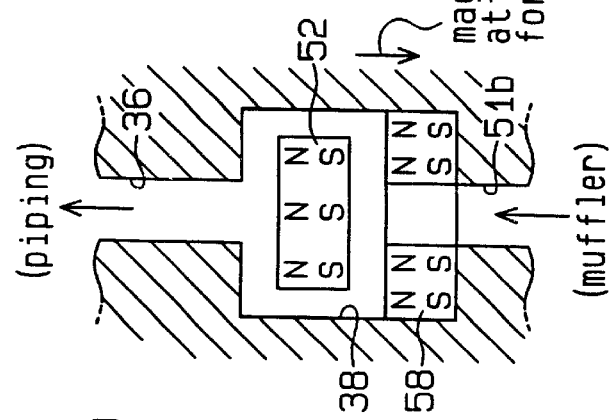
FIG. 11B is a cross-sectional view showing a resonance suppressing adapter employed in a sixth embodiment according to the present invention.
Figure 11C:
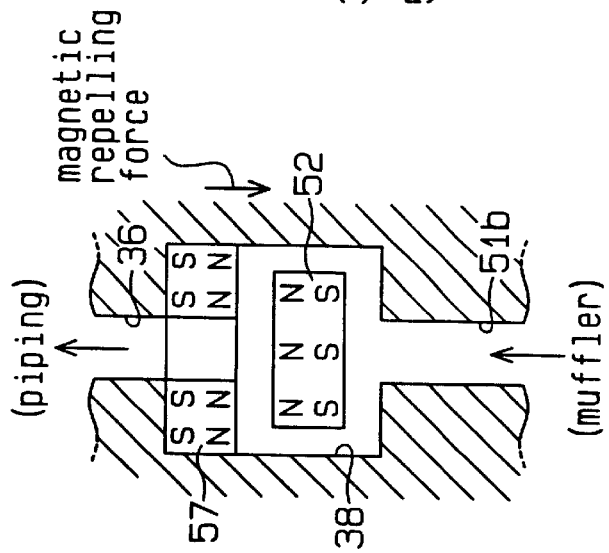
FIG. 11C is a cross-sectional view showing a resonance suppressing adapter employed in a second embodiment according to the present invention.

The adapters of FIGS. 11A to 11C use magnetic force to urge the float valve 52 in a direction opposite to the flow of the refrigerant gas and to limit the movement of the float valve 52. In these cases, the float valve 52 is made of magnetic material having the N pole and S pole. Alternatively, the float valve 52 may have a magnet embedded therein. The float valve 52 serves as a first magnetic body.

In FIG. 11A, a second magnetic body, or an annular magnet 57 is located on the downstream side of the accommodation chamber 38 (on the side of the outlet 36). The magnet 57 and the facing surface of the float valve 52 have the same polarity (N in the figure). Accordingly, a repelling force exists between the magnet 57 and the float valve 52, and this urges the float valve 52 toward the upstream side (the side of the communication bore 51b) of the accommodation chamber 38.

In FIG. 11B, a second magnetic body, or an annular magnet 58 is provided on the entrance side of the accommodation chamber 38 (on the side of the communication bore 51b). The magnet 58 and the facing surface of the float valve 52 have different magnetism. Accordingly, attraction force is produced between the magnet 58 and the float valve 52, and this urges the float valve 52 toward the entrance side of the accommodation chamber 38.

In FIG. 11C, the magnets 57, 58 are provided on the downstream and the upstream side of the accommodation chamber 38. In this structure, both a repelling force and an attraction force between the magnets 57, 58 and the float valve 52 urge the float valve 52 toward the communication bore 51b.

Each structure of FIGS. 11A to 11C has the same function and advantages as the adapter 50 of FIG. 2. An urging member such as a spring is not necessary in the accommodation chamber 38, and this simplifies the structure and facilitates determining the flow resistance of refrigerant gas flowing through the adapter.

The present invention may be used in other types of compressors such as swash plate type compressors with single-headed pistons or scroll type compressors. Also, the present invention may be used in systems other than vehicle air conditioning, such as, a fluid management system that requires transporting pressurized fluid.

Therefore, the present examples and embodiments are to be considered as illustrative and not restrictive and the invention is not to be limited to the details given herein, but may be modified within the scope and equivalence of the appended claims.

What is claimed is:

1. A method for reducing pipe resonance of a pipe carrying pressurized fluid when the pressurized fluid flows from an intermittently pressurized zone along a fluid passage that includes the pipe, the method comprising:

providing a movable valve body in the fluid passage, wherein the valve body can be moved by the flow of the pressurized fluid;

supporting the valve body only by an elastic member, wherein the elastic member applies a force to the valve body;

restricting the movement of the valve body with a predetermined restricting force, wherein the restricting force is based on the force of the elastic member; and determining the restricting force such that the frequency of pressure variation of the pressurized fluid flowing in the pipe is changed to differ significantly from the natural frequency of the pipe or such that the amplitude of pressure variation of the pressurized fluid flowing in the pipe is reduced.

2. An apparatus for reducing pipe resonance of a pipe carrying pressurized fluid when the pressurized fluid is conveyed to flow from an intermittently pressurized zone along a fluid passage that includes the pipe, the apparatus comprising:

a movable valve body located in the fluid passage, wherein the valve body can be moved by the flow of the pressurized fluid; and an elastic member for applying a predetermined restricting force to the valve body, wherein the valve body is supported only by the elastic member, wherein the restricting force is determined such that the frequency of pressure variation of the pressurized fluid flowing in the pipe is changed to differ significantly from the natural frequency of the pipe or such that the amplitude of pressure variation of the pressurized fluid flowing in the pipe is reduced.

3. The apparatus according to claim 2, wherein elastic member urges the valve body against the flow of the pressurized fluid.

4. The apparatus according to claim 3, wherein the elastic member includes a spring.

5. The apparatus according to claim 3, wherein a chamber for accommodating the valve body is located between the intermittently pressurized zone and the pipe, the valve body being movable within the accommodation chamber between a first position, at which the accommodation chamber is connected to the intermittently pressurized zone, and a second position, at which the accommodation chamber is disconnected from the pressurized zone, wherein the elastic member urges the valve body toward the second position, and the pressurized fluid in the pressurized zone urges the valve body toward the first position.

6. The apparatus according to claim 5, wherein the force of the elastic member is determined such that the valve body is moved reciprocally twice for each pressurization of the fluid to the intermittently pressurized zone.

7. The apparatus according to claim 5, wherein the force of the elastic member is determined such that the valve body occupies intermediate positions between the first position and the second position and is moved reciprocally within a relatively small range by the flow of pressurized fluid and the elastic member.

8. The apparatus according to claim 2, further comprising an accommodation chamber, which is located in the fluid passage and accommodates the valve body, wherein the accommodation chamber has an inlet for allowing the pressurized fluid to flow into the accommodation chamber from the pressurized zone and an outlet for allowing the pressurized fluid to flow out of the accommodation chamber, wherein the inlet and the outlet are located on opposite sides of the valve body.

9. A compressor discharging pressurized fluid to a pipe connected to the compressor, the compressor comprising:

a pressurized zone, wherein pressurized fluid is intermittently supplied to the pressurized zone;

an accommodation chamber located between the pressurized zone and the pipe;

a valve body located in the accommodation chamber, the valve body being movable within the accommodation chamber between a first position, at which the accommodation chamber is connected to the pressurized zone, and a second position, at which the accommodation chamber is disconnected from the pressurized zone, wherein the pressurized fluid in the pressurized zone urges the valve body toward the first position; and a spring for urging the valve body toward the second position, wherein the valve body is supported only by the spring, the spring exerting a predetermined force on the valve body such that the frequency of pressure variation of the pressurized fluid differs significantly from the natural frequency of the pipe.

10. The apparatus according to claim 9, wherein the spring exerts a predetermined force on the valve body such that the valve body is moved reciprocally twice each time the intermittently pressurized zone is pressurized.

11. The compressor according to claim 9, wherein the pressurized zone includes at least one of a discharge chamber and a discharge muffler.

12. The compressor according to claim 9, wherein the accommodation chamber has an inlet for allowing the pressurized fluid to flow into the accommodation chamber from the pressurized zone and an outlet for allowing the pressurized fluid to flow out of the accommodation chamber into the pipe, wherein the inlet and the outlet are located on opposite sides of the valve body.

13. The compressor according to claim 11, further comprising a muffler housing for defining the discharge muffler, wherein the accommodation chamber is defined in the muffler housing to be adjacent to the discharge muffler.

14. A compressor discharging pressurized fluid to a pipe connected to the compressor, the compressor comprising:

a pressurized zone, wherein pressurized fluid is intermittently supplied to the pressurized zone;

an accommodation chamber located between the pressurized zone and the pipe;

a valve body located in the accommodation chamber, the valve body being movable within the accommodation chamber between a first position, at which the accommodation chamber is connected to the pressurized zone, and a second position, at which the accommodation chamber is disconnected from the pressurized zone, wherein the pressurized fluid in the pressurized zone urges the valve body toward the first position; and a spring for urging the valve body toward the second position, wherein the valve body is supported only by the spring, the spring exerting a predetermined force on the valve body such that the amplitude of pressure variation of the pressurized fluid is reduced.

15. The apparatus according to claim 14, wherein the spring exerts a predetermined force on the valve body such that the valve body occupies intermediate positions between the first position and the second position and is moved reciprocally within a relatively small range by the flow of pressurized fluid and the spring.

16. The compressor according to claim 14, wherein the pressurized zone includes at least one of a discharge chamber and a discharge muffler.

17. The compressor according to claim 14, wherein the accommodation chamber has an inlet for allowing the pressurized fluid to flow into the accommodation chamber from the pressurized zone and an outlet for allowing the pressurized fluid to flow out of the accommodation chamber into the pipe, wherein the inlet and the outlet are located on opposite sides of the valve body.

18. The compressor according to claim 16, further comprising a muffler housing for defining the discharge muffler, wherein the accommodation chamber is defined in the muffler housing to be adjacent to the discharge muffler.

* * * * *